(12) United States Patent
Gunawardena et al.

(10) Patent No.: US 8,934,384 B2
(45) Date of Patent: Jan. 13, 2015

(54) PACKET-BASED INPUT/OUTPUT INTERFACE FOR A CORRELATION ENGINE

(75) Inventors: Sanjeev Gunawardena, Athens, OH (US); Jeff Dickman, Thousand Oaks, CA (US); Mathew A. Cosgrove, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 145 days.

(21) Appl. No.: 13/593,028

(22) Filed: Aug. 23, 2012

(65) Prior Publication Data
US 2013/0051285 A1   Feb. 28, 2013

Related U.S. Application Data

(60) Provisional application No. 61/526,490, filed on Aug. 23, 2011.

(51) Int. Cl.
*H04B 1/709* (2011.01)
*H04L 5/16* (2006.01)

(52) U.S. Cl.
CPC ...... *H04B 1/709* (2013.01); *H04B 2201/70715* (2013.01)

USPC .......... 370/277; 375/142; 375/148; 375/150; 375/224

(58) Field of Classification Search
None
See application file for complete search history.

(56) References Cited

U.S. PATENT DOCUMENTS

| | | | |
|---|---|---|---|
| 5,798,732 A * | 8/1998 | Eshenbach | 342/357.62 |
| 5,903,597 A * | 5/1999 | Pon | 375/150 |
| 6,546,040 B1 * | 4/2003 | Eschenbach | 375/140 |
| 2009/0066574 A1 * | 3/2009 | De Lorenzo et al. | 342/357.12 |
| 2009/0149202 A1 * | 6/2009 | Hill et al. | 455/456.6 |

* cited by examiner

*Primary Examiner* — Hassan Kizou
*Assistant Examiner* — Tejis Daya
(74) *Attorney, Agent, or Firm* — Tarolli, Sundheim, Covell & Tummino LLP

(57) ABSTRACT

A navigation system includes a correlation engine configured to despread a received signal. The correlation engine includes a correlator configured to evaluate the received signal against a replica signal to produce a correlation result, and a packet encoder configured to produce a packet comprising a destination address, a source address, and the correlation result. An input/output interface is configured to provide the packet to another component in the navigation system.

19 Claims, 3 Drawing Sheets

PACKET-BASED INPUT/OUTPUT INTERFACE FOR A CORRELATION ENGINE

RELATED APPLICATIONS

The present invention claims priority from U.S. Provisional Patent Application No. 61/526,490, filed Aug. 23, 2011, which is incorporated herein in its entirety by reference.

FIELD OF THE INVENTION

The invention relates generally to navigation systems. More specifically, the invention relates to a packet-based input output interface for a correlation engine in a navigation system.

BACKGROUND OF THE INVENTION

The fundamental baseband digital signal-processing component used in a global navigation satellite system (GNSS) receiver is known as a correlator. It correlates digitized samples of a received GNSS signal output by an analog-to-digital converter (ADC) with locally generated replicas of the carrier and spreading code components of the signal being received. If the local replica is adequately aligned with the carrier and code components of the received signal, a large correlation result is produced. The signal can be processed according to parameters of the signal derived from the aligned local replica, thereby providing observability of the actual received signal parameters whose power level can be well below that of thermal noise. Fundamentally, these received signal parameters are the magnitude of the despread signal and phase of its carrier with respect to the locally generated carrier.

SUMMARY OF THE INVENTION

In accordance with an aspect of the present invention, a navigation system is provided. The navigation system includes a correlation engine configured to despread a received signal. The correlation engine includes a correlator, which will be configured to evaluate the received signal against a replica signal to produce a correlation result via the packetized interface, and a packet encoder configured to produce a packet comprising a destination address, a source address, and a payload. An input/output interface is used to configure the correlation engine and to provide the correlation result to another component in the navigation system.

In accordance with another aspect of the present invention, a navigation system is provided. The navigation system includes a system control and a plurality of receiver platforms, with each receiver platform including at least one of a plurality of correlation engines configured to despread a received signal. The system control includes a packet encoder configured to produce a packet comprising a destination address, a source address, and configuration data for the plurality of receiver platforms and an input/output interface configured to provide the packet to the plurality of receiver platforms. Each correlation engine includes a correlator configured to evaluate the received signal against a replica signal to produce a correlation result and an input/output interface configured to transmit and receive packetized data.

In one implementation, the system control is a first system control of a plurality of system controls and each of the plurality of system controls sharing access to at least one of the plurality of receiver platforms.

In accordance with still another aspect of the present invention, a method is provided for utilizing a packetized interface. Parameters defining a replica signal are encoded in a first packet at a system control. The first packet is transmitted to a receiver platform. The defined replica signal is generated at the receiver platform. The replica signal is compared to the received signal to provide a correlation result. The correlation result is encoded in a second packet. The second packet is transmitted to the system control.

BRIEF DESCRIPTION OF THE DRAWINGS

The features, objects, and advantages of the invention will become more apparent from the detailed description set forth below when taken in conjunction with the drawings, wherein.

DETAILED DESCRIPTION OF THE INVENTION

Figure 1:
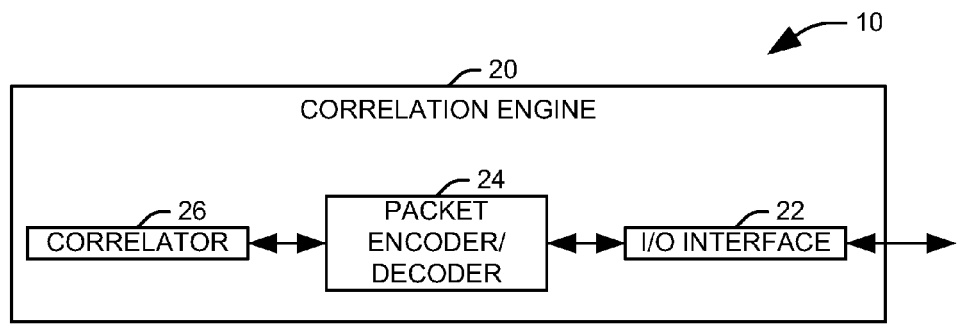
FIG. 1 illustrates one example of a navigation system in accordance with an aspect of the present invention.

The present invention relates generally to navigation systems and can be implemented within any appropriate navigation system that relies on signal despreading. For the purpose of example, the foregoing description is drawn specifically to implementations of GNSS receivers, but it will be appreciated that the invention is generally applicable to any navigation system. The fundamental baseband digital signal processing component used in a GNSS receiver is known as a correlation engine, or correlator. A correlation engine correlates digitized samples of a received GNSS signal output from an analog-to-digital converter (ADC) with locally generated replicas of the carrier and spreading code components of the signal being received. If the local replica is adequately aligned with the carrier and code components of the received signal, a large correlation result is produced. The signal can be processed according to parameters of the signal derived from the aligned local replica, thereby providing observability of the actual received GPS signal parameters whose power level can be well below that of thermal noise. These received signal parameters represent the magnitude of the de-spread signal and phase of its carrier with respect to the locally generated carrier.

The correlation occurs at the sample rate of the ADC, which is proportional to the designed bandwidth of the receiver front-end. Typically, sample rates can range between four megahertz to ninety megahertz, depending on the design of the front-end. This sample rate is typically too high to use anything other than custom digital hardware to perform the correlation operation. During the normal operation of a GNSS receiver, the receiver is configured to dynamically adapt to varying operational conditions, with the goal of producing the best range measurements possible, that is, range measurements with the lowest possible measurement error and noise. As part of this process, the total time necessary to perform the correlation, referred to as pre-detection integration time, is varied, typically in integer millisecond steps.

In one implementation, the GPS receiver algorithms are partitioned between hardware and software running on a microprocessor. The correlation is performed for up to one-millisecond in hardware and the results are transferred to a software correlator, where further integration may be performed. The software can control the replica carrier and code generators resident in the digital hardware at one-millisecond epochs. Accordingly, bidirectional communication is maintained between the hardware correlators and the software, and in one implementation, this communication occurs continuously at a rate of up to one kilohertz.

In accordance with an aspect of the present invention, significant processing gain and robustness is achieved by combining navigation signals from several antenna elements at the signal correlation level. For example, signals from multiple antenna elements can be combined to form a virtual antenna with a large aperture. Synthetic antennas can be formed, for example, by a multitude of unmanned aerial vehicles (UAVs) flying in tight formation. In a receiver architecture in accordance with an aspect of the present invention, the correlation resources as well as the remaining receiver processing are not constrained to a fixed platform. In fact, the host platforms and their correlation resources may change over time. This interfacing to dynamic local and remote correlation resources by dynamic local and remote hosts is addressed by using a packet-based interface.

FIG. 1 illustrates one example of a navigation system 10 in accordance with an aspect of the present invention. The navigation system 10 includes a correlation engine 20 configured to receive a set of at least one parameter defining a replica signal and return a correlation result representing the similarity of a received signal to the replica signal. The correlation engine 20 can be implemented as hardware, software operating on a general purpose processor, or a combination of software and hardware elements. In one implementation, the correlation engine 20 is implemented as a programmable logic device, such as a field programmable gate array (FPGA).

In accordance with an aspect of the present invention, the correlation engine 20 includes an input/output (I/O) interface 22 configured to transmit and receive packetized data over a data connection. It will be appreciated that the data connection can comprise any appropriate connection for transmitting packetized data, including a wired or wireless network connection. Such a network could include various components (not shown) of the navigation system, such as other correlation engines, a control system of the navigation system, or one or more receiver components. In one implementation, the network allows a control system of the navigation system to provide control parameters to one or more correlations engines, such as the set of parameters defining the replica signal.

The packets received at the I/O interface 22 are provided to a packet encoder/decoder 24 configured to extract data for at least one associated correlator 26 from a received packet. For example, a given packet can include a heading containing information concerning its source, destination, and an associated length of a packet payload. The packet payload can include instructions for one or more correlator systems, including sets of parameters defining replica signals for analysis at the correlators. The correlator 26 receives the set of parameters from the packet encoder/decoder and generates a replica signal based on the set of parameters.

A set of digital samples representing the carrier and spreading code components of a received navigation signal can be provided via the packet encoder/decoder 24 or another data connection, and the correlator 26 can evaluate the received navigation signal with the locally generated replica signal, and provide a correlation result representing the similarity of the received signal to the local replica. The correlation result can be provided to the packet encoder/decoder 24 to prepare a new packet containing data representing the correlation result. This packet can be transmitted from the I/O interface 22 to one or more other components of the navigation system. For example, the correlation results can be provided to a system control, including software to accumulate results over a period of time to provide additional correlation energy. This allows for a more accurate determination of the signal characteristics.

Figure 2:
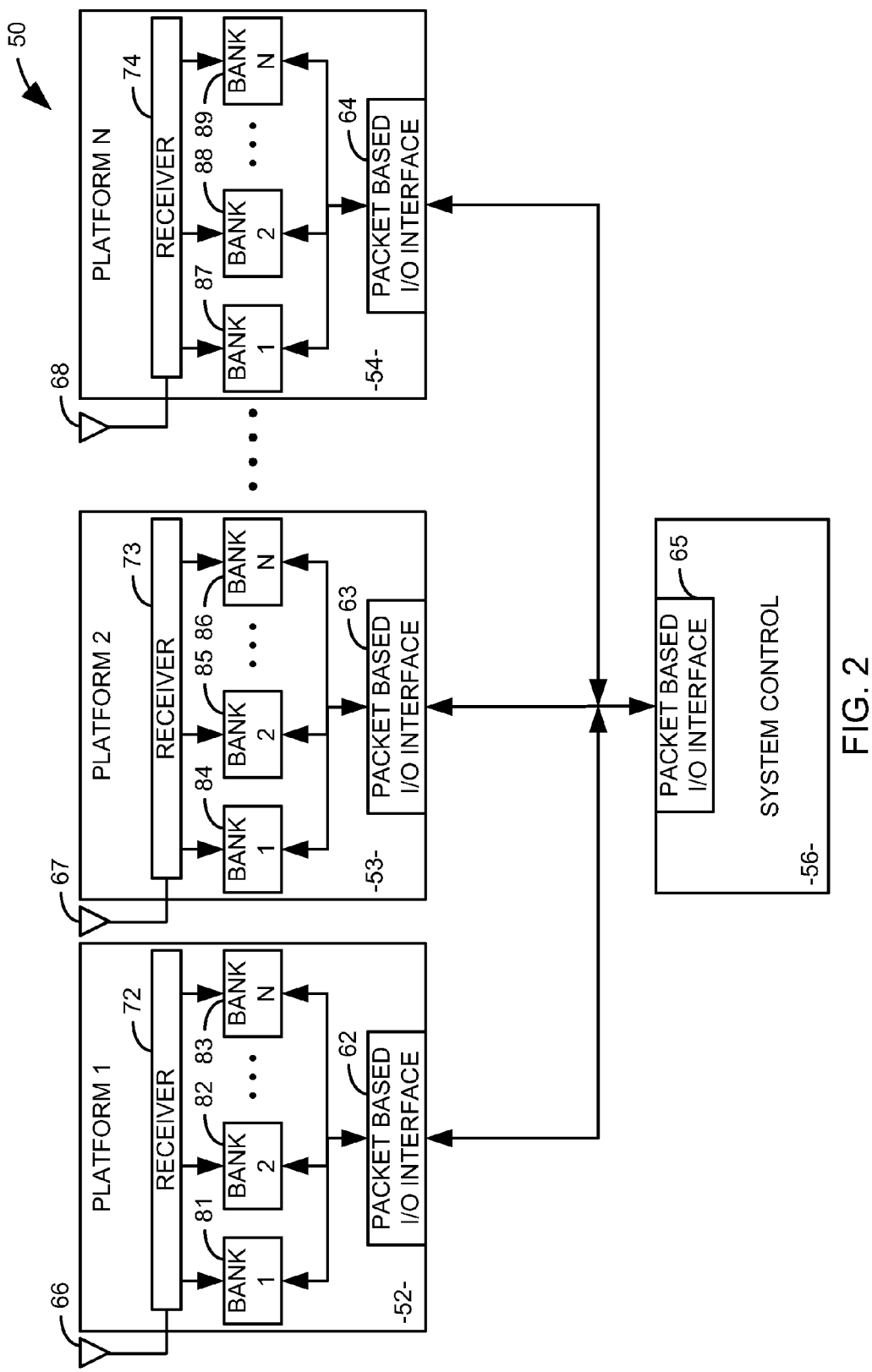
FIG. 2 illustrates one implementation of a GNSS in accordance with an aspect of the present invention.

FIG. 2 illustrates one implementation of a GNSS system 50 in accordance with an aspect of the present invention. In the illustrated implementation, a plurality of receiver platforms 52-54 are controlled by a corresponding system control 56. For example, the receiver platforms 52-54 can represent individual manned or unmanned air vehicles. To this end, each of the receiver platforms 52-54 and the system control 56 can include an associated packet input/output (I/O) interface 62-65, collectively forming a packet-based communications system, to facilitate communication between the receiver platforms 52-54 and the system control 56.

The packet-based communication system is configured to transfer a large number of words using a single burst to and from the system control 56. The system control 56 is instructed to provide instructions to the receiver platforms 52-54 by the generation of a periodic interrupt, which in the illustrated implementation occurs every millisecond. The intervals between interrupts are referred to as epochs. By transmitting the instructions to the receiver platforms 52-54 as a single, large packet, the system control 56 is allowed sufficient time to read and process the large number of correlation results and apply new commands within the epoch-to-epoch interval. For example, the commands can include parameters defining carrier and code numerically controlled oscillator (NCO) rates and phase states for the replica codes, code generator modes, instructions for half-duplex correlators to output either the in-phase or quadrature component, parameters defining code generator spacing, instructions to instantaneously advance or retard a code-phase state, register I/O commands and queries, and instructions to change space-time adaptive processing (STAP) weights and delays dynamically. It will be appreciated that, while the system control 56 is illustrated as distinct from the receiver platforms 52-54, in one implementation, the system control 56 can be located on one of the receiver platforms. In another implementation, each receiver platform 52-54 has appropriate hardware and software for implementing a system control, and the control responsibilities can be transferred among platforms via the packet input/output (I/O) interfaces 62-65. In still another implementation, the receiver platforms 52-54 and their associated correlator resources can be shared by multiple local and remote user interfaces. To this end, each receiver platform, as well as each correlator resource on a given platform, has an associated identifier to allow it to be addressed from any of multiple local or remote user interfaces and be dynamically reconfigured through the packetized interface by any one of these multiple interfaces to perform a desired function.

At each receiver platform 52-54, incoming satellite signals are received by a multi-element GPS antenna 66-68 and converted into usable signals at the associated receivers 72-74. For example, the receivers 72-74 can include a multi-channel RF front-end that downconverts the received signal to baseband. The front-ends in the various receivers 72-74 use the same clock for different channels, and thus do not introduce inter-channel clock biases and drifts. The downconverted signals are then digitized and provided to a plurality of correlator banks 81-83, 84-86, and 87-89.

Each correlator bank 81-89 can be implemented as one of two types of correlators, referred to as Type 1 and Type 2, and addressed as a virtual channel. These channels perform back-to-back GNSS signal correlation for the duration of one-millisecond. Buffers within each Type 1 or Type 2 bank hold the results formatted as one or more packets. These packets are gathered up in sequential order and placed in a first-in-first-out (FIFO) buffer ready to be transferred to the host processor. While results that were valid during the previous epoch are transferred out, the channels load new commands for the current epoch received via the packet-based communication interface 62-64 and contained in holding registers, and continue processing for the current epoch.

Type 1 channels are independent correlation channels comprised of three full-complex correlators. In the illustrated implementation, a Type 1 virtual correlator channel consists of an input data stream selector, a replica carrier numerically controlled oscillator (NCO), replica code NCO, replica code generator, programmable code delays, and six multiply-accumulate units with associated result-hold registers. For the carrier NCO, a thirty-two bit stair-step function is mapped into sine and cosine replicas represented by two bits (i.e., values −1, 0, and 1). These values are used in the accumulation process to perform the carrier wipe off operation. The channel supports programming of the NCO phase increment per sample as well as a thirty-two bit phase state register. The latter supports instantaneous initialization of the replica carrier to support channel cloning and channel resource management functions via software.

The code NCO is functionally identical to the carrier NCO, except that overflows of the phase register are used to sense chip increments for the code generator, such that the code generator increments by one chip when an overflow occurs. In addition, a subset of the NCO phase state is sent to a programmable lookup table (LUT) to implement a square-wave subcarrier for a binary offset carrier (BOC) modulation scheme.

The code generator is comprised of several programmable linear-feedback shift registers (LFSRs) that are XOR'd together to form the final replica pseudo-random noise (PRN) code sequence. Each stage of the LFSR is tapped and input to a look-up-table (LUT). The LUT is programmable at runtime to form the polynomial of the spreading sequence for a given spreading code. An unused LFSR can be disabled by programming all zeros to the register, which will result in the singular state. An LFSR is programmed via the packet input/output (I/O) interface 62-64 by writing to its initialization register. This value is applied to the LFSR starting at the first sample of the next epoch. This allows the software to program any supported GNSS code type, a PRN number of that code type, and the starting whole-chip phase of the code.

The most significant two bits of the thirty-two bit word assigned to program a given LFSR register controls the various modes of the LFSR register. This allows the software to program the code generator to a given state for extremely long sequences using a minimal amount of host memory and processing. In a set mode, the LFSR is loaded with the state contained in the received packet. In a turbo mode, the LFSR register increments on every core clock cycle (~300 MHz) for a specific number of cycles as provided in the received packet, allowing rapid transition to a specific LFSR state from a known LFSR, which is used to jump to specific code phase states for very long sequences whose initialization states are too large to be stored in host memory. In hold mode, the LFSR state is halted to allow it to be skewed with respect to other LFSR states. In a run mode, the LFSR register steps once for each overflow occurrence of the NCO. The output of the XOR gate is sent to a one-bit multiplier that is used to apply the square-wave subcarrier necessary for BOC codes. Multiple programmable rate square-wave and other multi-level periodic subcarriers are derived from the code NCO phase register using look-up tables similar to the carrier NCO.

The output of the code generator is sent to two programmable delay stages. The direct output and the two delayed outputs of the code together form an 'Early', 'Prompt', and a 'Late' version of the code that will form the corresponding correlations for the code phase discriminator for code tracking. The programmable delays allow software to control the Early-minus-Late correlation spacing independently for each channel. Moreover, since the delays can be programmed in an epoch-by-epoch basis, it allows a host software algorithm to 'peek around' the prompt correlator at runtime. This functionality can be used for numerous innovative applications such as BOC code 'bump jumping', signal deformation monitoring, multipath estimation, and spoofer detection.

Type 2 channels are independent correlation channels comprised of a massive bank of half-complex correlators. A Type 2 virtual correlator channel consists of an input data stream selector, a replica carrier NCO, a replica code NCO, a replica code generator, a series of programmable delays, and a massive bank of multiply-accumulate units with associated result-holding storage elements. Except for the massive bank of multiply-accumulate units, the corresponding programmable delay elements, and the multiplexer that selects either the in-phase or quadrature-phase of the carrier replica, other features of the Type 2 correlator are substantially identical to the Type 1 correlator.

The implementation of the carrier NCO is identical to that of a Type 1 correlator. However, the in-phase or quadrature-phase carrier replica component can be switched into the one-dimensional correlator bank. This reduces hardware resources for the Type 2 correlator, allowing for a larger number of virtual Type 2 correlator channels to be implemented. The resulting implementation is referred to as a 'half-complex' correlator. Half-complex correlators can be switched at runtime to correlate with either the in-phase component or the quadrature-phase component of the local carrier replica on an epoch-by-epoch basis. This allows Type 2 channels to perform phase-aligned tracking by 'peeking' the quadrature-phase component from time to time to obtain residual phase error estimates. Alternatively, two Type 2 channels can be combined to implement a full complex massive-bank correlator.

In a Type 2 channel, the output of the code generator is sent to a bank of programmable delay stages. Hence, the chip spacing between the 1024 points of the massive bank correlator can be configured at runtime to allow zoom-out and zoom-in views of the correlation space via software control. In addition, by also stepping the whole-chip phase of the code generator, the zoom-in view can be extended over time or across virtual channels to support an extremely-high-resolution correlation space capability for correlation space situational awareness' applications such as signal quality monitoring and spoofer detection. It will be appreciated that any of the parameters governing the replica codes and carriers, the delays, and the selection between half-complex and full complex modes of operation can be altered via the packetized interface formed by the packet I/O interfaces 62-65 to reconfigure the correlator hardware accordingly.

The system control 56 retrieves the results via a burst transfer and uploads new commands that are used to program numerically controlled oscillators (NCOs) and code generators that produce the replica signals within the virtual channels. The incoming packets are expected to be received sometime during the first half of the current epoch. When new data is available in the input FIFO, a packet decoder associated with the receiver platform 52-54 parses the new commands from the system control and routes them to the appropriate channels where they are held until applied at the next epoch. Accordingly, the correlation results associated with a given set of commands is received at the system control 56 two epochs after the commands were issued.

In accordance with an aspect of the present invention, the system control 56 can utilize the correlation results from the plurality of receiver platforms 52-54 to increase the efficiency and accuracy of the signal location. Effectively, the outputs of individual antenna elements are combined for digital beam forming to enable spatial cancellation of emitters. Beamforming algorithms can utilize various optimization criteria for the computation of spatial array weights such as minimum variance (MV), minimum variance distortion-less response (MVDR), and adaptive filtering with bias constraints. All algorithms for the computation of digital beam-forming weights require characterization of the emitter signal environment. Conventionally, emitters are characterized by the multi-element signal covariance matrix that is computed at a pre-correlation step.

Signal covariance between different array elements is computed based on down-sampled GPS signal at the output of a temporal filter. For emitter-free cases, this matrix has a diagonal form. The presence of emitters introduces non-zero non-diagonal terms. Estimates of signal covariance are directly incorporated into the weight computation procedure. In addition to pre-correlation emitter characterization, the use of reconfigurable receiver architecture allows utilization of other methods of characterizing emitter signals. Particularly, pre-correlation characterization does not allow identification of threats that are below the noise floor: such as, for example, spoofing and meaconing signals.

The threats can be efficiently identified using a post-correlation approach, in which the array beam is steered in multiple directions using one-millisecond correlation outputs. Local energy maxima in angular directions other than the satellite's identify emitter signals. Digital beam-forming algorithms can then be augmented by nulling constraints in order to suppress the influence of these additionally observed sources of interference on the signal tracking quality. Output of the phased array is coherently accumulated over an extended period of time (20-ms or longer) for robust signal tracking. The system architecture supports deep integration with inertial navigation for very long coherent accumulation intervals such as 1 second, with outputs from spatially diverse receiver platforms 52-54 linked by the packet-based communication system in accordance with an aspect of the present invention. Deep integration is implemented to enable code and carrier phase tracking of weak GPS signals whose power is thirty decibels below open-sky signal conditions (such as, for instance, signals attenuated by broadband noise).

In the illustrated system, signal accumulation results are applied to directly estimate signal parameters and without involving traditional tracking loops. Open loop tracking estimates signal parameters directly from the GPS correlation space, which is represented as a complex correlation output against code phase and Doppler shift from the code and carrier search space implemented by the one-millisecond correlation engine. The use of open-loop tracking is particularly beneficial for robust performance in degraded signal environments as it allows for an immediate recovery of the signal tracking status after a temporary loss without the need for tracking loop pull-in time, which is generally one or two seconds. Finally, the open-loop signal estimation results, such as code and carrier phase, can be applied by the control system to compute a position, velocity and timing solution.

Figures 3, 4:
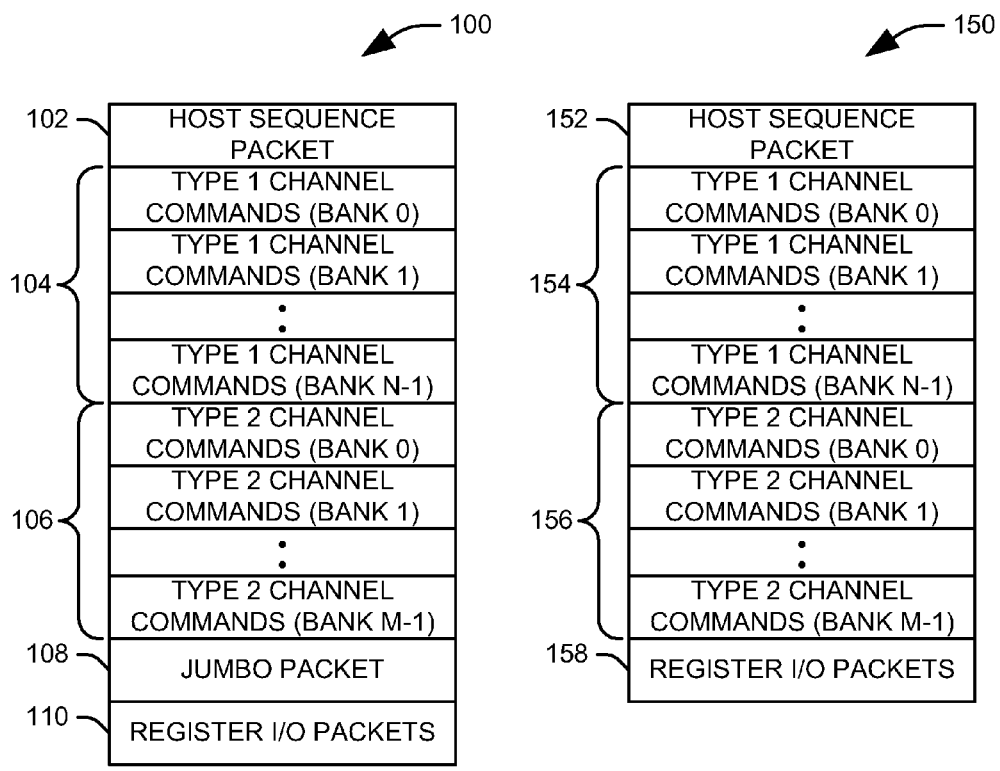
FIG. 3 is a table illustrating a packet block that might be sent from a system control to one or more receiver platforms.
FIG. 4 is a table illustrating a packet block that might be sent from a receiver platform to a system control.

FIG. 3 is a table 100 illustrating one example of a packet block sent from a system control to one or more receiver platforms. The packet block 100 includes a Host Sequence Packet 102 (HSP), Type 1 channel command packets 104 for a plurality of Type 1 correlator banks, Type 2 channel command packets 106 for a plurality of Type 2 correlator banks, and, optionally, a jumbo data packet 108 and multiple Register I/O packets 110 for configuring and querying registers at the receiver platforms. Each packet in the packet block can have a data payload and a header including version number, used as a preamble for the packet, a header length, a total packet length, a source address, and a destination address.

The Host Sequence Packet (HSP) is used for integrity monitoring in communications between the system control and the receiver platforms. During operation, when the set flag is asserted, an internal sequence counter at the receiver is set to a Host Sequence Number provided by the Host Sequence Packet and any error flags that may have appeared in the error field of outgoing Client Sequence Packets is cleared. At subsequent epochs, the host must send sequence packets with an increment of one. If an increment is not received at the next epoch, the correlator asserts the error flag of the Client Sequence Packet to indicate a sequence mismatch. The twenty-four bit sequence number will roll back to zero after a maximum value is reached.

When updates are decoded and applied to the internal correlators, the host sequence number is copied to a temporary register within the correlator. This value is subsequently copied to an outgoing Client Sequence Packet during the same epoch when correlator outputs are gathered and packetized by the correlator. Hence, the sequence number can also be used by the host to associate the correlation results will the NCO updates that were used to process them.

The command packets 104 and 106 contain parameters governing the operation of their respective correlator systems. The payload of each command packet can include parameters defining carrier and code NCO rates and phase states for the replica codes, code generator modes, instructions for half-duplex correlators to output either the in-phase or quadrature component, parameters defining code generator spacing, instructions to instantaneously advance or retard a code-phase state, register I/O commands and queries, and instructions to change space-time adaptive processing (STAP) weights and delays dynamically. The first three packet types 102, 104, and 106 have fixed lengths after initial channel setup to allow the host software memory regions to be allocated and locked only once to handle these packets. The jumbo packet 108 may or may not be fixed length. The type and number of Register I/O packets 110 will generally vary depending on how the host software is controlling and querying the correlators. Hence, these packet types are defined last so that packet encoding in software is kept to a minimum. That is, once the fixed length-packets are defined, the software only needs to modify the payload, leaving the overall packet structure intact.

FIG. 4 is a table 150 illustrating one example of a packet block sent from a receiver platform to a system control. The packet block 150 includes the Client Sequence Packet 152 (CSP), Type 1 channel outputs 154 for a plurality of Type 1 correlator banks, Type 2 channel outputs 156 for a plurality of Type 2 correlator banks, and, optionally, Register I/O packets 158 representing replies to queries issued in the previous epoch. The Client Sequence Packet 152, in combination with the Host Sequence Packet, assists in maintaining communications integrity, as described previously. The channel outputs 154 and 156 represent correlation results from the various correlator banks.

Figure 5:
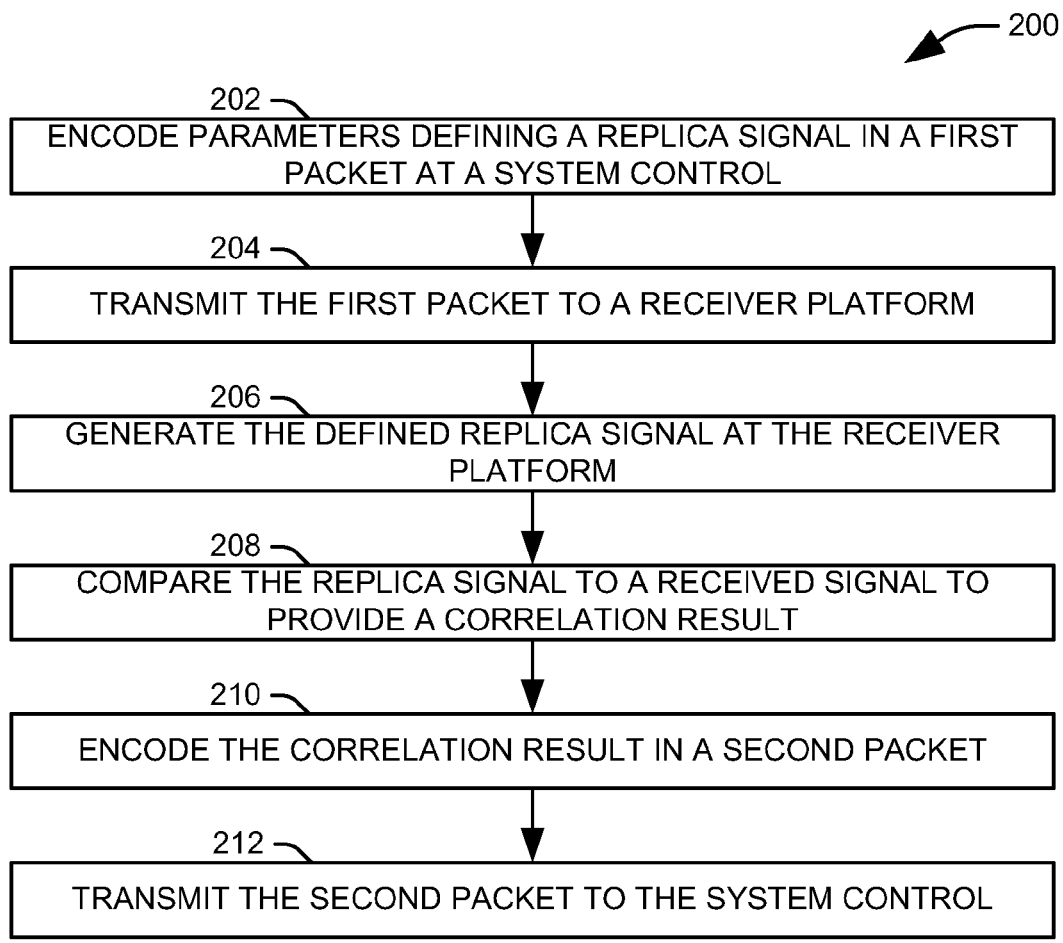
FIG. 5 illustrates a methodology for utilizing the packetized interface in accordance with an aspect of the present invention.

In view of the foregoing structural and functional features described above, example methodology will be better appreciated with reference to FIG. 5. While, for purposes of simplicity of explanation, the methodology of FIG. 5 are shown and described as executing serially, it is to be understood and appreciated that the present invention is not limited by the illustrated order, as some actions could, in other examples, occur in different orders from that shown and described herein or could occur concurrently.

FIG. 5 illustrates a method 200 for utilizing a packetized interface in accordance with an aspect of the present invention. At 202, parameters defining a replica signal are encoded in a first packet at a system control. In one implementation, the encoded parameters can include a host sequence value. The first packet is transmitted to a receiver platform at 204. In one implementation, the first packet is sent every millisecond to provide new configuration parameters to the receiver platform. At 206, the defined replica signal is generated at the receiver platform and compared to the received signal to provide a correlation result at 208. At 210, the correlation result is encoded in a second packet, and the second packet is transmitted to the system control at 212.

In one implementation, correlation results from respective second packets transmitted from the plurality of receiver platforms over a period of time can be combined to determine at least one characteristic of the received signal. In implementations in which the host sequence value is present, the system control using the host sequence value to match the replica signal in the first packet to the correlation result in the second packet. In another implementation, correlation results are combined across the plurality of receiver platforms to characterize of the received signal. For example, where the receiver platforms are mobile, they can be maintained in a tight formation such that the correlation results from the plurality of receiver platforms are combined to form a large aperture, synthetic antenna.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Having described the invention, we claim:

1. A navigation system comprising:
   a correlation engine configured to despread a received signal, the correlation engine comprising:
   a correlator configured to evaluate the received signal against a replica signal to produce a correlation result;
   a packet encoder configured to produce a packet comprising a destination address, a source address, and the correlation result; and
   an input/output interface configured to provide the packet to another component in the navigation system.

2. The navigation system of claim 1, wherein the other component comprises a system control configured to combine correlation results from the correlation engine over a period of time to determine at least one characteristic of the received signal.

3. The navigation system of claim 2, wherein the correlation engine is a first correlation engine of a plurality of correlation engines, and the system control is further configured to combine correlation results from the plurality of correlation engines to determine the at least one characteristic of the received signal.

4. The navigation system of claim 3, wherein the system control is located on a receiver platform associated with a second correlation engine of the plurality of correlation engines.

5. The navigation system of claim 3, wherein each of the plurality of correlation engines is part of a receiver platform on an associated unmanned air vehicle.

6. The navigation system of claim 1, wherein the input/output interface is configured to receive a configuration packet from the other component in the navigation system, the correlation engine changing at least one parameter associated with the correlation engine in response to the configuration packet.

7. The navigation system of claim 6, the at least one parameter including a parameter defining whether the correlation engine is operating in a half-duplex or a full-duplex mode.

8. The navigation system of claim 6, the at least one parameter including a parameter defining whether the correlation engine provides the in-phase or quadrature component when operating in a half-duplex mode.

9. The navigation system of claim 6, the at least one parameter including a parameter defining a rate for one of a carrier numerically controlled oscillator and a code numerically controlled oscillator.

10. A navigation system comprising:
    a plurality of receiver platforms, each including at least one of a plurality of correlation engines, each correlation engine configured to despread a received signal and comprising:
    a correlator configured to evaluate the received signal against a replica signal to produce a correlation result;
    a packet encoder configured to produce a packet comprising a destination address, a source address, and the correlation result; and
    an input/output interface configured to transmit and receive packetized data; and
    a system control configured to combine correlation results from the plurality of correlation engines to determine the at least one characteristic of the received signal comprising:
    a packet encoder configured to produce a packet comprising a destination address, a source address, and configuration data for the plurality of receiver platforms; and
    an input/output interface configured to provide the packet to the plurality of receiver platforms.

11. The navigation system of claim 10, the configuration data including instructions to change space-time adaptive processing weights.

12. The navigation system of claim 10, wherein the system control is located on a first receiver platform of the plurality of receiver platforms.

13. The navigation system of claim 12, wherein the configuration data includes instructions to a second receiver platform of the plurality of receiver platforms to host the system control, such that the system control is transferred from the first receiver platform to the second receiver platform.

14. The navigation system of claim 10, wherein the system control is a first system control of a plurality of system controls, each of the plurality of system controls sharing access to at least one of the plurality of receiver platforms.

15. A method for utilizing a packetized interface comprising:
- encoding parameters defining a replica signal in a first packet at a system control;
- transmitting the first packet to a receiver platform;
- generating the defined replica signal at the receiver platform;
- comparing the replica signal to the received signal to provide a correlation result;
- encoding the correlation result in a second packet; and
- transmitting the second packet to the system control.

16. The method of claim 15, wherein transmitting the first packet to a receiver platform comprises transmitting respective first packets to a plurality of receiver platforms, the method further comprising combining correlation results from respective second packets transmitted from the plurality of receiver platforms to determine at least one characteristic of the received signal.

17. The method of claim 16, wherein the plurality of receiver platforms are mobile receiver platforms, the method further comprising maintaining the plurality of receiver platforms in a tight formation such that the correlation results from the plurality of receiver platforms are combined to form a large aperture, synthetic antenna.

18. The method of claim 17, wherein transmitting the first packet to a receiver platform comprises transmitting the first packet to a receiver platform once each millisecond to provide correlation parameters for a correlation engine associated with the receiver platform for that millisecond.

19. The method of claim 17, wherein encoding parameters defining a replica signal in a first packet at a system control comprises providing a host sequence value with the first packet, the system control using the host sequence value to match the replica signal in the first packet to the correlation result in the second packet.

* * * * *